United States Patent [19]

Hida et al.

[11] 3,797,021

[45] Mar. 12, 1974

[54] METHOD OF RECORDING A PATTERN IN AN ELECTROSTATIC RECORDING UNIT

[75] Inventors: Makoto Hida; Akira Goto, both of Yokohama, Japan

[73] Assignee: Jujitsu Limited, Kawasaki, Japan

[22] Filed: July 12, 1971

[21] Appl. No.: 161,773

[30] Foreign Application Priority Data

July 15, 1970 Japan ................................ 45-61514

[52] U.S. Cl. ............................ 346/74 ES, 346/74 S

[51] Int. Cl. ........................................... G01d 15/06

[58] Field of Search ............ 346/74 ES, 74 E, 74 S; 101/DIG. 13; 178/30

[56] References Cited

UNITED STATES PATENTS

| | | | |
|---|---|---|---|
| 3,157,456 | 11/1964 | Kikuchi | 346/74 ES |
| 3,624,661 | 11/1971 | Shebanow | 346/74 ES |
| 2,764,693 | 9/1956 | Jacobs | 346/74 ES |
| 3,644,931 | 2/1972 | Stringer | 346/74 ES |
| 3,611,419 | 10/1971 | Blumenthal | 346/74 ES |

*Primary Examiner*—Bernard Konick
*Assistant Examiner*—Jay P. Lucas
*Attorney, Agent, or Firm*—Herbert L. Lerner

[57] ABSTRACT

In a method of recording a pattern in an electrostatic recording unit and the like in which dot patterns are formed by recording needles positioned in zigzag relation and moved toward the direction of feeding of a record medium, pattern signals are read out of a memory unit in which they are stored. The pattern signals are stored to be shifted in correspondence with the zigzag-positioned recording needles, and a pattern overflow area produced by shifting in correspondence with the zigzag-positioned recording needles is stored in the blank portion of the pattern area. The pattern signals read out are converted to the new pattern signals in correspondence with zigzag-positioned recording needles. The new pattern signals are applied to the zigzag-positioned recording needles to store in the record medium a pattern stored in the memory unit.

3 Claims, 13 Drawing Figures

PRIOR ART

METHOD OF RECORDING A PATTERN IN AN ELECTROSTATIC RECORDING UNIT

DESCRIPTION OF THE INVENTION:

The invention relates to a method of recording a pattern in an electrostatic recording unit. More particularly, the invention relates to a method of recording a pattern stored in a memory unit, which method is designed to facilitate the reading of a pattern signal from a read only memory unit and the application of the pattern signals to a plurality of recording needles, in an electrostatic recording unit utilizing a plurality of recording needles positioned in zigzag relation.

Normally positioned recording needles are arranged in rows and columns. There is thus a limit placed on the amount of insulation which may be provided between the recording needles when the interval therebetween is narrowed in order to provide more recording needles and therefore to provide a pattern having greater detail.

It is an object of our invention to provide a method of recording a pattern in an electrostatic recording unit, which method overcomes the disadvantage of known units of similar type.

Another object of the invention is to provide a plurality of recording needles in zigzag relation in an electrostatic recording unit to permit a greater number of recording needles to be utilized and still enable sufficient insulation to be provided between the needles.

Still another object of our invention is to provide a method of recording a pattern in an electrostatic recording unit, which method facilitates the reading of the pattern signals from a memory unit to the recording needles.

A further object of the invention is to provide a method of recording a pattern in an electrostatic recording unit, which method facilitates the reading of the pattern signals from a memory unit to a plurality of zigzag-positioned recording needles of an electrostatic recording unit.

Another object of the invention is to provide an electrostatic recording unit and a method of recording a pattern in an electrostatic recording unit which functions with efficiency, effectiveness and reliability.

In accordance with the invention, a method of recording a pattern in an electrostatic recording unit and the like, in which dot patterns are formed by recording needles positioned in zigzag relation and moved toward the direction of feeding of a record medium, comprises the steps of reading pattern signals out of a memory unit in which they are stored, converting the pattern signals into new pattern signals shifted in correspondence with the zigzag-positioned recording needles, and applying the new pattern signals to the zigzag-positioned recording needles to store in the record medium a pattern stored in the memory unit.

The record medium has a pattern area having a blank portion, and a pattern overflow area produced by shifting the pattern signals is stored in the blank portion of the pattern area.

In accordance with the invention, an electrostatic recording unit includes a record medium and a plurality of recording needles in operative proximity with the record medium, the needles being positioned in zigzag relation.

In order that the invention may be readily carried into effect, it will now be described with reference to the accompanying drawings, wherein.

Figure 1:
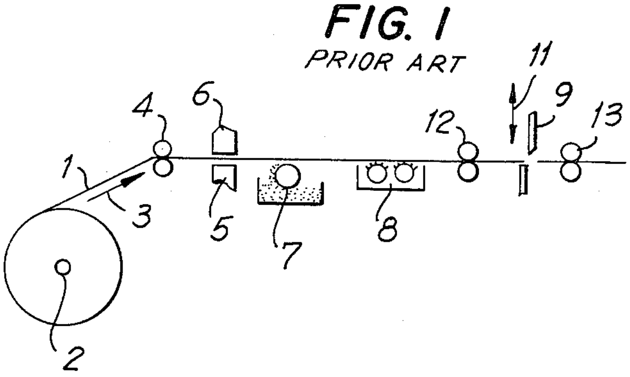
FIG. 1 PRIOR ART
FIG. 1 is a schematic diagram of an electrostatic recording unit of known type.

FIG. 1 illustrates an electrostatic recording unit. In FIG. 1, a recording sheet 1 is wound on a roller 2 and is fed from said roller in the direction of an arrow 3 by a pinch roller 4. An electric charge corresponding to pattern signals supplied to a plurality of recording needles 5 is applied to the recording sheet or record medium 1 when said sheet passes between said recording needles and an opposing electrode 6. The recording sheet 1 carries a latent image of the pattern due to the electric charge, and is moved in the direction of the arrow 3 to a developing vessel 7.

In the developing vessel 7, a black-colored plastic powder, charged to the opposite polarity from that of the electric charge, is applied to the electric charge on the recording sheet 1. The black plastic powder thus forms a visible image on the recording sheet 1 corresponding to the pattern indicated by the pattern signals. The plastic powder forming the image is fixed by thermal or heat means in a fixing vessel 8, thereby fixing the image of the pattern on the recording sheet 1.

The recording sheet 1, having the visible image of the pattern stored thereon, is cut in desired sizes by a cutter 9, which moves in the directions of arrows 11, substantially perpendicular to the record medium 1. The cutter 9 is positioned between two pairs of rollers 12 and 13, which maintain the record medium 1 sufficiently taut.

Figure 2A:
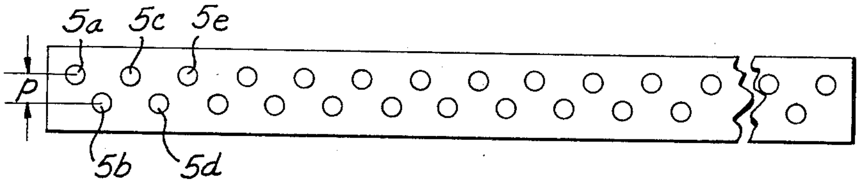
FIGS. 2a and 2b are schematic diagrams of the recording needles of the invention.
Figure 2B:
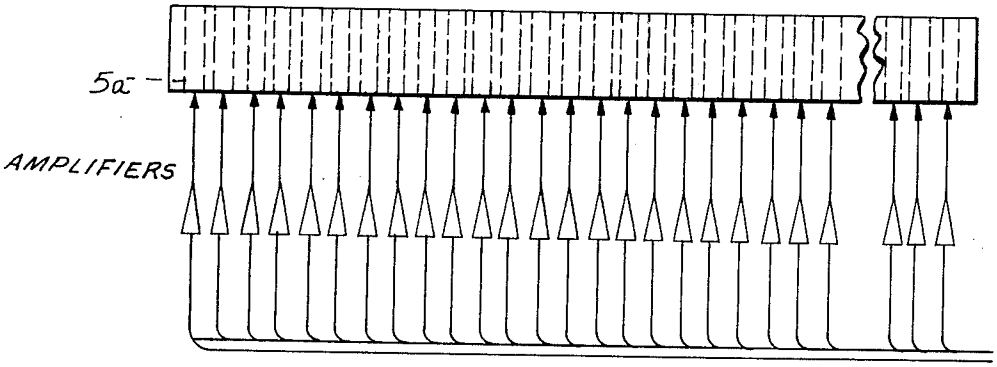

FIG. 2 is a top plan of a plurality of recording needles which may be utilized as the recording needles 5 of the electrostatic recording unit of FIG. 1. FIG. 2b is a side view of the recording needles of FIG. 2*a* and closely related circuitry. In FIGS. 2*a* and 2*b*, the recording needles 5*a*, 5*b*, 5*c*, 5*d*, and so on are positioned substantially perpendicularly to the direction of feeding of the recording medium 1 and substantially perpendicularly to said recording medium, itself. Thus, the more narrow the interval between recording needles, the more detailed the pattern stored in the record medium 1.

Generally, however, since a voltage of approximately 400 to 500 volts is applied to the recording needles 5, toward the opposite electrode 6, a limit is placed on the insulation between adjacent ones of said recording needles when the interval therebetween is attempted to be narrowed in order to provide more detailed pattern reproduction. In order to eliminate this disadvantage, the recording needles 5*a*, 5*b*, and so on are positioned in zigzag relation, as shown in FIGS. 2*a* and 2*b*. The zigzag positioned recording needles 5 enable a greater number of recording needles to be utilized and permit better insulation between such recording needles.

As shown in FIG. 2a, the recording needles 5*a*, 5*b*, and so on are shifted by a pitch p from a linear arrangement, so that signals simultaneously read out from a memory unit cannot be supplied simultaneously to the zigzag-positioned recording needles. In a conventional electrostatic recording unit, signals read out from a memory unit may be simultaneously supplied to a plurality of recording needles which are linearly positioned in the conventional manner.

Figures 3A, 3B, 3C:
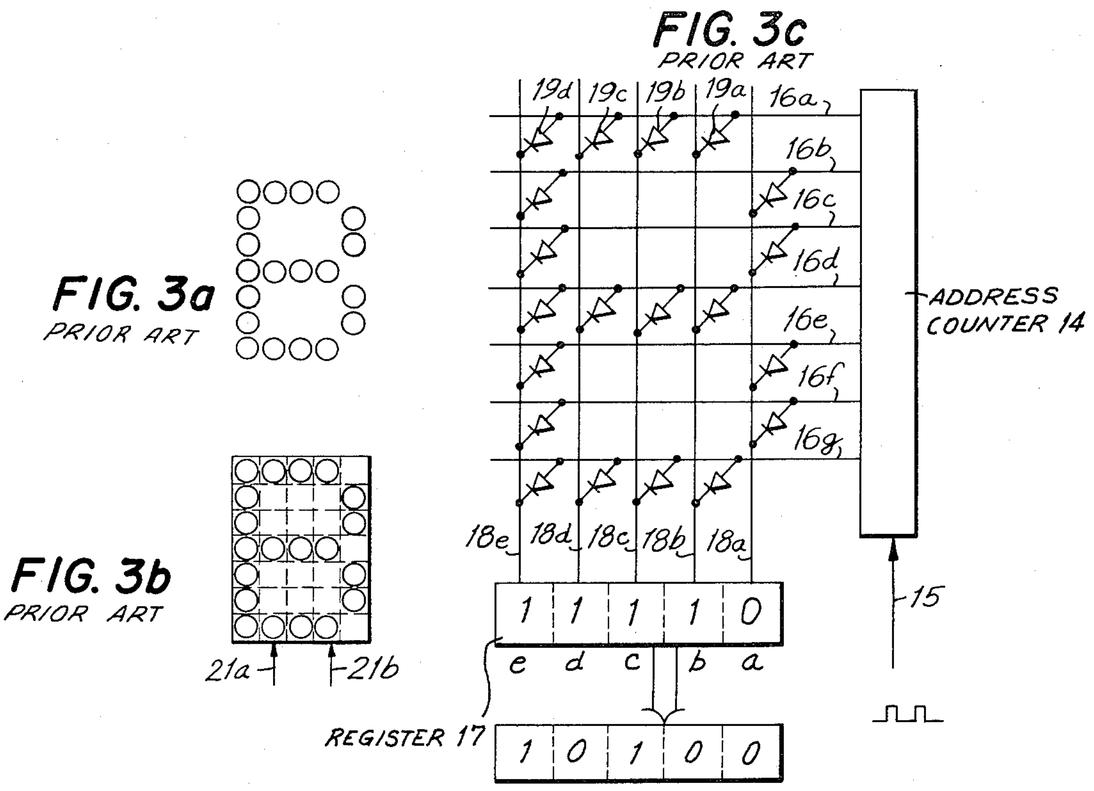
FIGS. 3a, 3b and 3c are schematic diagrams and a circuit diagram of a memory unit for storing a known pattern.

FIGS. 3*a*, 3*b* and 3*c* illustrate a memory unit for storing signals in a known method of recording or storage. It is assumed, for the purposes of illustration, that the letter B of the alphabet is stored or recorded. The letter B is expressed in a dot structure, as shown in FIG. 3*a*. In the known or conventional recording system, the letter B is stored in accordance with the pattern thereof, as shown in FIG. 3*b*. The read out or reading of the pattern of the letter B is hereinafter described by assuming that the read-only memory unit comprises a diode matrix circuit, as shown in FIG. 3*c*.

The address of the letter B is selected from the memory unit to permit an address counter 14 to count in sequence via a shift pulse SP supplied to said counter via a lead 15. The address counter 14 thus sequentially energizes a plurality of drive lines 16*a*, 16*b*, 16*c*, 16*d*, 16*e*, 16*f* and 16*g* connected to the outputs of said counter. The drive lines 16*a* to 16*g* are part of the matrix circuit. A register 17 is connected to a plurality of matrix lines 18*a*, 18*b*, 18*c*, 18*d* and 18*e*, which are substantially parallel to each other and which intersect the parallel drive lines 16*a* to 16*g*. Each of a plurality of diodes 19*a*, and so on is connected at each intersection of the lines 16*a* to 16*g* and 18*a* to 18*e*, to each of said lines, as shown in FIG. 3*c*, in the manner of the known type of matrix circuit.

The register 17 registers the bits of the diodes 19*a*, and so on which are sequentially rendered conductive. Thus, the register 17 registers "1" for the sequentially conductive diodes 19*a*, and so on. The register 17 therefore registers the bit structures 1 1 1 1 0, for the diodes 19*a* to 19*d* connected to the drive line 16a and rendered conductive, 1 0 0 0 1 for the diodes connected to the drive line 16*b* and rendered conductive, 1 0 0 0 1 for the diodes connected to the drive line 16*c* and rendered conductive, 1 1 1 1 0 for the diodes connected to the drive line 16*d* and rendered conductive, 1 0 0 0 1 for the diodes connected to the drive line 16*e* and rendered conductive, 1 0 0 0 1 for the diodes connected to the drive line 16*f* and rendered conductive, and 1 1 1 1 0 for the diodes connected to the drive line 16*g* and rendered conductive. The foregoing bit structures are thus sequentially registered in the register 17, as the recording sheet 1 is fed in the direction of the arrow 3 (FIG. 1).

The information or information signals are supplied to the recording needles, if said recording needles are linearly positioned. However, if the recording needles are positioned in zigzag relation, as shown in FIGS. 2*a* and 2*b*, the dot structure set for the register 17 must be shifted in order to divide, for example, 1 1 1 1 0 into 1 0 1 0 0 and 0 1 0 1 0, thus supplying the recording needles twice. The supply of two sets of information in good time relation results in a complicated control arrangement.

Figures 4A, 4B:
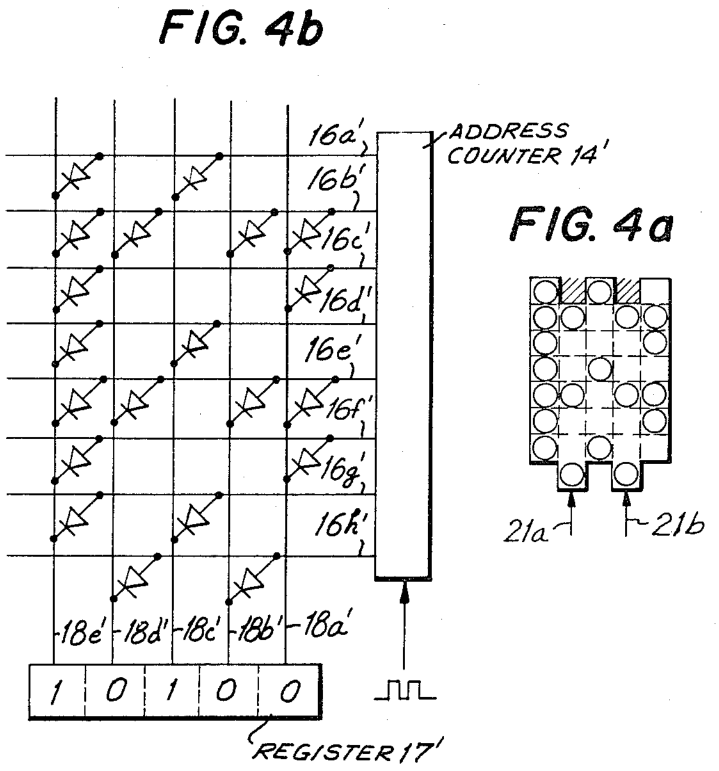
FIGS. 4a and 4b are a schematic diagram and a circuit diagram of an embodiment of a memory unit for storing the pattern of the method of the invention.

In view of the foregoing, the invention comprises a method for facilitating the control of a system for storing the pattern in the memory unit in a manner different from the known methods. The memory unit of the invention is different from the known memory units, and is shown in FIGS. 4*a* and 4*b*. The difference between FIGS. 4*a* and 4*b* and FIGS. 3*b* and 3*c* is that the information stored in lines 21*a* and 21*b* (FIG. 3*b* and FIG. 4*a*) is shifted by the pitch difference p of the recording needles. Although in one embodiment of the invention the pitch p represents one pitch, it is not so restricted. Thus, FIG. 4*a* illustrates the case where the lines 21*a* and 21*b* of FIG. 3*b* are shifted by one pitch. FIG. 4*b* illustrates the same case where the storage pattern is structured by the diode matrix.

As is clearly understood, since the pattern is recorded by being shifted in advance, the recording or storage may be achieved only by supplying the sequentially read out dot structures to the zigzag-positioned recording needles in accordance with the supply or feeding of the recording sheet. A difficulty which arises, however, is that no information is supplied to the cross-hatched portions of FIG. 4*a*. This results in a substantial loss of the storage capacity when a large number of letters are stored or when letters having many dots such as, for example, Chinese letters, and the like, are stored.

Figure 5:
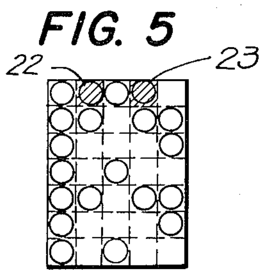
FIG. 5 is a schematic diagram of another embodiment of a memory unit for storing the pattern of the method of the invention.

In another embodiment of the invention, as shown in FIG. 5, there is no substantial loss in the storage capacity, due to the storage of the pattern overflow bits or overflow area in the cross-hatched portions 22 and 23. Furthermore, there is no necessity, in the embodiment of FIG. 5, as in the embodiment of FIGS. 4a and 4b, for analyzing the bit structures read out to the zigzag-positioned recording needles. This is dissimilar to the conventional system.

The operation of reading the bit structures out of the storage or memory unit, in the case of storage as illustrated in FIG. 5, is hereinafter described with reference to FIGS. 6, 7, 8 and 9. A read-only storage or memory unit 24, shown in FIG. 8, may comprise any suitable form such as, for example, a magnetic drum, disk, core memory, diode matrix of the aforedescribed type, or the like. In the read-only memory unit 24 of FIG. 8, the dot pattern for one time read-out is supplied to a plurality of addresses 25*a*, 25*b*, 25*c*, and so on.

If, for example, the letter B is stored in the addresses 25*a* to 25*g*, in accordance with the storage system illustrated in FIG. 5, the other letters are stored in the addresses 25*h* to 25*n* and 25*o* to 25*u*. It is assumed that the electrostatic recording is based upon a computer output and that the computer output for a single letter comprises eight bits.

Figure 6:
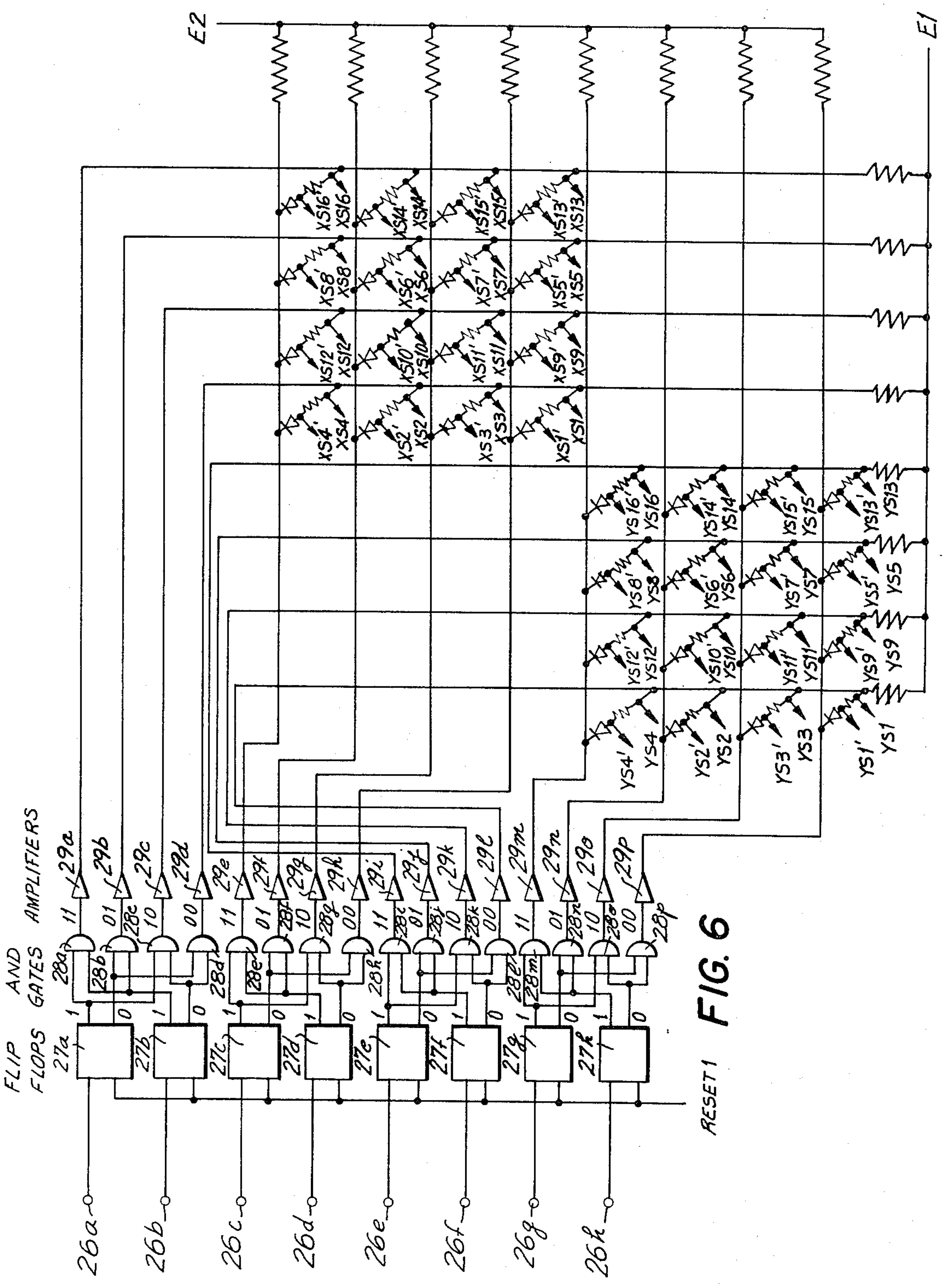
FIG. 6 is a block and circuit diagram of an embodiment of an address decoder circuit utilized in an embodiment of the memory unit of the method of the invention.

FIG. 6 illustrates an alphabet letter decoding circuit, wherein the codes corresponding to the letters to be recorded are fed into input terminals 26*a*, 26*b*, 26*c*, 26*d*, 26*e*, 26*f*, 26*g* and 26*h*. When the letter to be recorded is B and the corresponding code is 0 0 0 0 0 0 0 1, only a flip flop 27h of a plurality of flip flops 27*a* to 27*h* is set at "1." A plurality of AND gates 28*a* to 28*p* are connected to the set and reset outputs of the flip flops 27*a* to 27*h*, as shown in FIG. 6. The outputs of the AND gates 28*a* to 28*p* are connected to the inputs of a plurality of amplifiers 29*a* to 29*p*, as shown in FIG. 6.

When the letter to be recorded is B and only the flip-flop 27h is set at "1," only the amplifiers 29*d*, 29*h*, 29*l* and 29*n* produce outputs. Accordingly, the terminals at which voltages may be coincidentally provided in the matrix are XS1, XS1' and YS2, YS2'. Furthermore, the terminals XS1, XS1' and YS2, YS2' are connected to the address energizing circuit to energize the matrix line.

Figure 7:
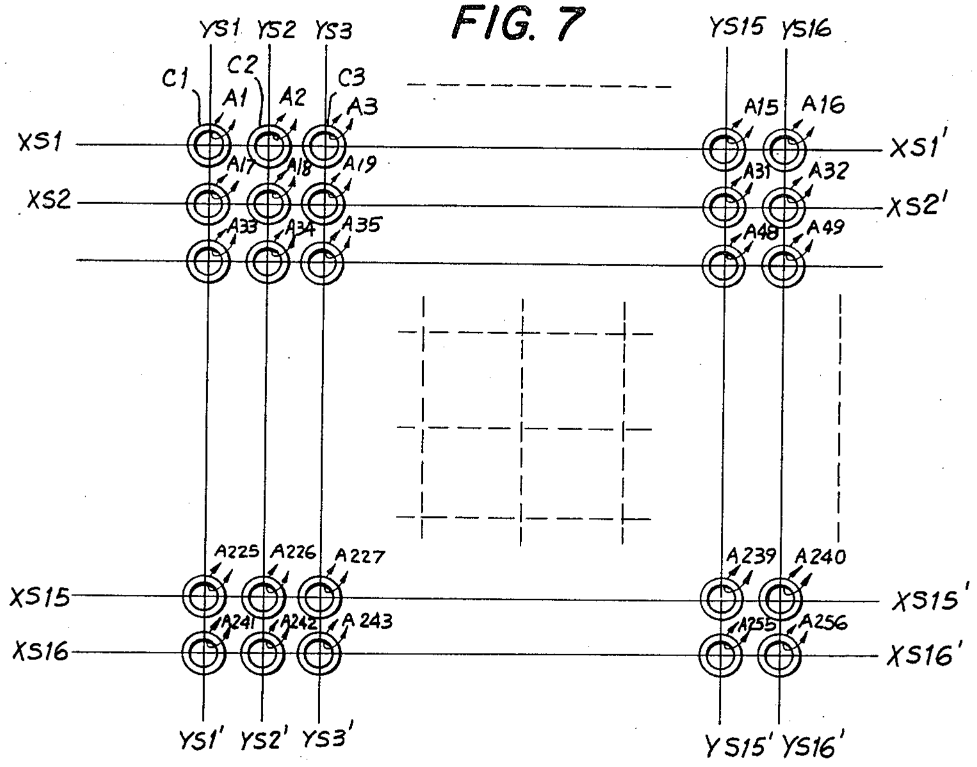
FIG. 7 is a circuit diagram of a matrix for energizing the address selected by the address decoder circuit of FIG. 6.

In FIG. 7, each of a plurality of ring cores C1, C2, C3, and so on has two energizing or driving lines passing through its center. An output is produced only when an electric current flows through both driving lines. When an electric current flows through matrix lines XS1, XS1' and YS1, YS1' (FIG. 7), the ring core C2 is energized and an output is produced in an output line A2. The output line A2 of FIG. 7 is connected to the read out line A2 of the address read-only storage unit 24 of FIG. 8.

Figure 8:
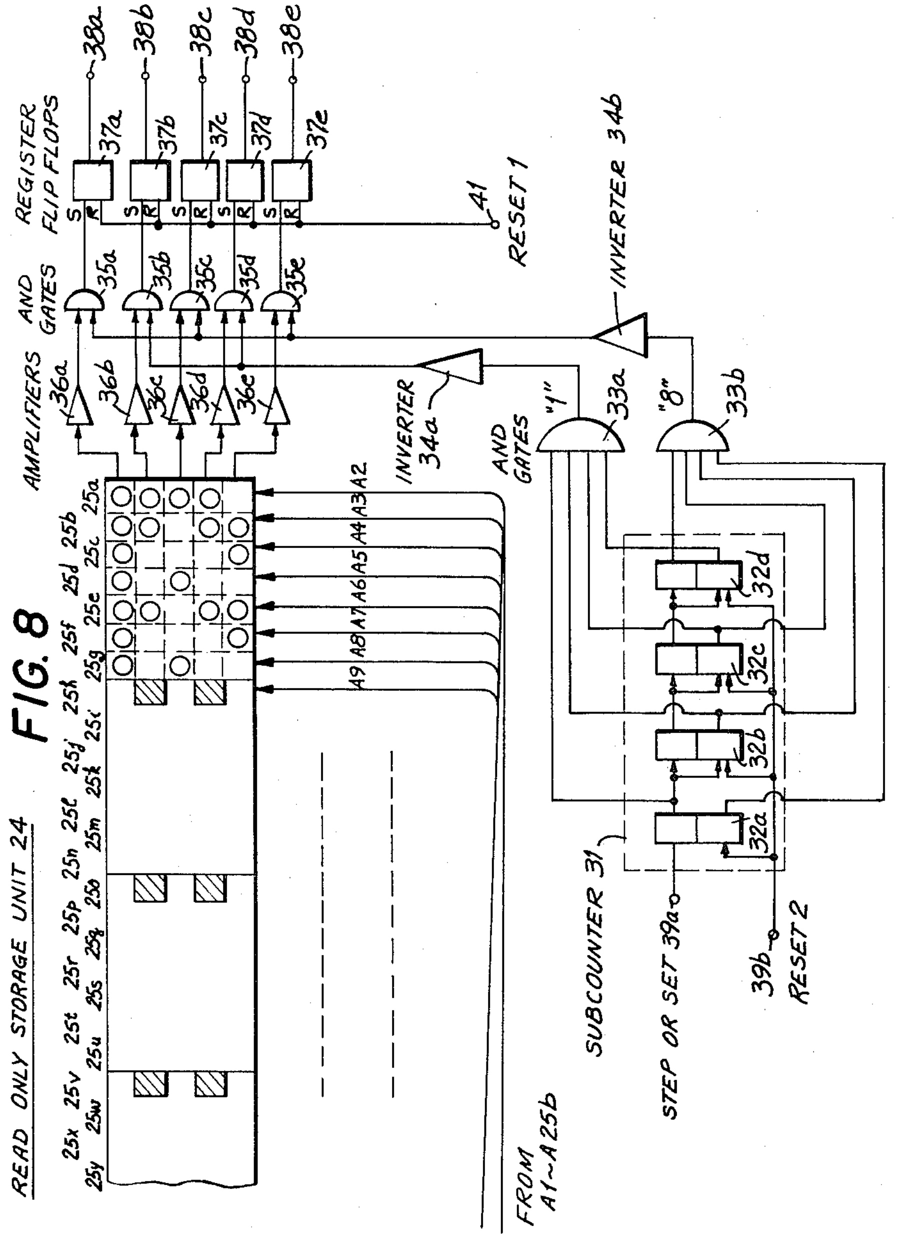
FIG. 8 is a block diagram of an embodiment of a memory unit circuit utilized in the method of the invention.

Thus, the bit structure of the address 25a is read out (FIG. 8). Since the overflow bit information is stored in the cross-hatched areas 22 and 23 of FIG. 5, such read out must be prohibited. This control is provided in accordance with the count, registration, or count condition of subcounter 31 of FIG. 8. That is, the subcounter 31 comprises four flip flops 32*a*, 32*b*, 32*c* and 32*d* and counts a step or set pulse produced at each read out of the bit structure of one address.

Each of a pair of AND gates 33*a* and 33*b* has four inputs connected to the set output of each of the flip flops 32*a* and 32*d* and the reset outputs of the flip flops 32*a* to 32*d* of the subcounter 31. The output of the AND gate 33*a* is connected through an inverter 34*a* to the second input of each of a pair of AND gates 35*b* and 35*d*. The output of the AND gate 33*b* is connected through an inverter 34*b* to the second input of each of a plurality of AND gates 35*a*, 35*c* and 35*e*.

The AND gate 33*a* indicates that the subcounter 31 has counted "1." The AND gate 33b indicates that the subcounter 31 has counted "8." The address is read out through a plurality of amplifiers 36*a*, 36*b*, 36*c*, 36*d* and 36*e*. Each of the amplifiers 36*a* to 36*e* is connected to the first input of a corresponding one of the AND gates 35*a* to 35*e*. When the contents of the address 25*a* are read out, the count indication of the subcounter 31 is "1" and the AND gate 33*a* produces an output signal. The inverter 34*a* prevents the energization of the second inputs of the AND gates 35*b* and 35*d*, however. The AND gates 35*b* and 35*d* thus produce no output signals.

A plurality of register flip flops 37*a*, 37*b*, 37*c*, 37*d* and 37e are provided, each having a set input connected to the output of a corresponding one of AND gates 35*a* to 35*e*. Thus, when the AND gates 35*b* and 35*d* do not produce an output signal, the register flip flops 37*a*, and 37*c* are set and produce a "1" output signal to provide a bit structure of 1 0 1 0 0. The bit structure is supplied from a plurality of output terminals 38*a*, 38*b*, 38*c*, 38*d* and 38*e*, connected to the outputs of the flip flops 37*a* to 37*e*, respectively, to the recording needles 5*a*, and so on, of FIGS. 2*a* and 2*b*, via the amplifiers shown in FIG. 2*b*.

The bit structure of the address 25*b* is then read out. In the invention, the bit structure corresponding to the letters supplied to the input terminals 26*a* to 26*h* of FIG. 6 indicates the initial address of the address group storing the letters corresponding to the bit structure. Thus, for example, the address 25*a* may be provided for 0 0 0 0 0 0 0 1. The bit structures for supply to the terminals 26*a* to 26*h* of FIG. 6 follow in sequence, one by one, in a circuit (not shown in the FIGS.) in synchronism with the timing of the step or set pulse supplied to an input 39*a* of the subcounter 31 of FIG. 8.

In other words, 0 0 0 0 0 0 0 1 corresponding to B is expressed as 0 0 0 0 0 0 1 0 when the subcounter 31 of FIG. 8 counts 2, thus supplying the terminals 26*a* to 26*h*. Therefore, the terminals XS1, XS1' and YS3, YS3' are selected in FIG. 6, so that the ring core C3 of FIG. 7 is selected to drive the address 25*b* of FIG. 8 via the drive line A3 (FIG. 7). Since the AND gates 35*a* to 35*e* are not restricted by the count condition of the subcounter 31, 1 1 0 1 1 is set for each of the register flip flop 37*a* to 37*e*.

Furthermore, each of the read out bit structures is supplied to the recording needles 5*a*, 5*b*, 5*c*, and so on, of FIGS. 2*a* and 2*b*, so that the read out of the bit structures for the addresses 25*a* to 25*g* and the energization of the recording needles are provided until the subcounter 31 of FIG. 8 counts 7. Thereafter, when the subcounter 31 (FIG. 8) counts 8, the crosshatched areas of the address 25*a* are read out and must be supplied to the recording needles 5*b* and 5*d* (FIGS. 2*a* and 2*b*).

As hereinbefore described, the bit structures supplied to the input terminals 26*a* 26*h* of FIG. 6 are in synchronism with the input step or set pulse supplied to the input terminal 39*a* of the subcounter 31 of FIG. 8 and are supplied in sequence. Furthermore, a circuit (not shown in the FIGS.) insures that the bit structures corresponding to the original letter B are attained by the eighth step or set pulse. Accordingly, the address 25*a* is driven by the drive line A2 (FIGS. 7 and 8) and the AND gate 33*b* produces an output signal because the count condition of the subcounter 31 (FIG. 8) is 8. The inverter 34*b* prevents the second input of each of the AND gates 35*a*, 35*c* and 35*e* (FIG. 8) from being energized, so that only the register flip flops 37b and 37d produce "1" output signals which are supplied to the recording needles 5*b* and 5*d* (FIGS. 2*a* and 2*b*).

Figure 9:
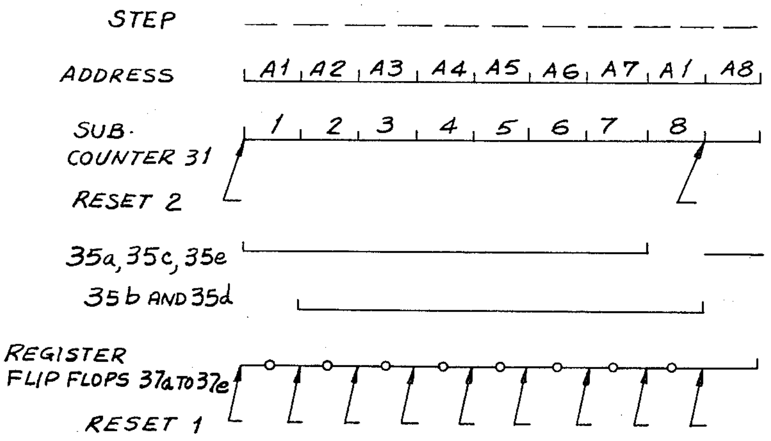
FIG. 9 is a time chart for each part of FIGS. 6, 7 and 8.

In the aforedescribed manner, a single letter is recorded in eight steps and the alphabet letter B is recorded by the input of the bit structure 0 0 0 0 0 0 0 1, as shown in FIG. 3*a*. FIG. 9 is a time chart which illustrates the aforedescribed operation. In the initial condition, each of the register flip flops 37*a* to 37*e* of FIG. 8 and the subcounter 31 of FIG. 8 are set at zero by reset pulses reset 1 supplied to an input terminal 41 and reset pulses reset 2 supplied to an input terminal 39*b*. When the step pulse is sequentially supplied to the input terminal 39*a* of the subcounter 31 (FIG. 8), said subcounter counts the pulses, one by one, and at the same time the drive lines A1 to A7 (FIGS. 7 and 8) drive the address. The AND gates 35*b* and 35*d*, and 35*a*, 35*c* and 35*e* are switched to their conductive condition only when the subcounter 31 has a count condition between 1 and 7, and 2 and 8, respectively.

The foregoing description of an embodiment of the invention has included an example of English letters utilizing 5 by 7 dots. This example is for illustrative purposes only. The invention is most effective when applied to a unit with a capacity for accommodating a large number of letters or when a large number of structure dots are utilized, as for Chinese letters.

While the invention has been described by means of specific examples and in specific embodiments, we do not wish to be limited thereto, for obvious modifications will occur to those skilled in the art without departing from the spirit and scope of the invention.

We claim:

1. A method of recording a pattern in an electrostatic recording unit and the like in which dot patterns are formed by recording needles positioned in zigzag relation and moved toward the direction of feeding of a record medium, said method comprising the steps of recording pattern signals out of a memory unit in which they are stored in correspondence with the zigzag-positioned arrangement of the zigzag-positioned recording needles and a pattern overflow area produced by shifting in correspondence with the zigzag-positioned recording needles and stored in the blank portion of the pattern area; converting the pattern signals read out into new pattern signals in correspondence with the zigzag-positioned recording needles; and applying the new pattern signals to the zigzag-positioned recording needles to store in the record medium a pattern stored in the memory unit.

2. Apparatus for recording a pattern in an electrostatic recording unit and the like in which dot patterns are formed by recording needles positioned in zigzag relation and moved toward the direction of feeding of a record medium, said apparatus comprising read only storage means having an output for reading pattern signals out of a memory unit in which they are stored in correspondence with the zigzag-positioned arrangement of the zigzag-positioned recording needles and a pattern overflow area produced by shifting in correspondence with the zigzag-positioned recording needles and stored in the blank portion of the pattern area; converting means having an output for converting the pattern signals into new pattern signals in correspondence with the zigzag-positioned recording needles; and applying means connecting the outputs of the read only storage means to the zigzag-positioned recording needles to store in the record medium a pattern stored in the memory unit.

3. Apparatus as claimed in claim 2, wherein the converting means comprises a subcounter having a plurality of flip flops connected in sequence, first AND gates having a plurality of inputs connected to different outputs of different ones of the flip flops and having outputs, a plurality of second AND gates each having an input connected to the output of the read only storage means and another input coupled to the outputs of the first AND gates and having other inputs, inverter means connected between outputs of the first AND gates and the other inputs of the second AND gates, and a plurality of register flip flops having inputs connected to the second AND gates.

* * * * *